United States Patent
Das et al.

(10) Patent No.: US 6,950,511 B2
(45) Date of Patent: Sep. 27, 2005

(54) DETECTION OF BOTH VOICE AND TONES USING GOERTZEL FILTERS

(75) Inventors: Sharmistha Das, Broomfield, CO (US); Matthew McShea, Superior, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 10/713,940

(22) Filed: Nov. 13, 2003

(65) Prior Publication Data

US 2005/0105716 A1 May 19, 2005

(51) Int. Cl.[7] .............................. H04M 1/00; H04M 9/00
(52) U.S. Cl. ............ 379/376.02; 379/386; 379/388.04; 379/388.05; 379/388.06
(58) Field of Search .............................. 379/376.02, 386

(56) References Cited

U.S. PATENT DOCUMENTS

| | | | |
|---|---|---|---|
| 5,119,322 A | | 6/1992 | Stroobach |
| 5,321,745 A | * | 6/1994 | Drory et al. ................. 379/351 |
| 5,521,967 A | | 5/1996 | Novas et al. |
| 5,563,952 A | * | 10/1996 | Mercer ......................... 381/56 |
| 6,370,244 B1 | | 4/2002 | Felder et al. |
| 6,381,330 B1 | * | 4/2002 | Johanson ..................... 379/386 |
| 6,608,896 B2 | * | 8/2003 | Felder et al. ................ 379/386 |
| 6,782,095 B1 | * | 8/2004 | Leong et al. ................ 379/386 |
| 2002/0076034 A1 | * | 6/2002 | Prabhu et al. |

* cited by examiner

*Primary Examiner*—Sinh Tran
*Assistant Examiner*—Ramnandan Singh
(74) *Attorney, Agent, or Firm*—David Volejnicek

(57) ABSTRACT

A plurality of Goertzel filters whose operating frequencies are distributed across the voice baseband are used to detect voice and control tones in a signal. Filters operating at frequencies of control tones and detecting that most of the signal energy occurs at those frequencies indicates presence of the control tones. At least three of the filters detecting that about 10% to 20% of the signal energy occurs at each of their operating frequencies indicate presence of voice. The total energy detected in the signal being below a noise threshold indicates presence of noise or silence.

18 Claims, 7 Drawing Sheets

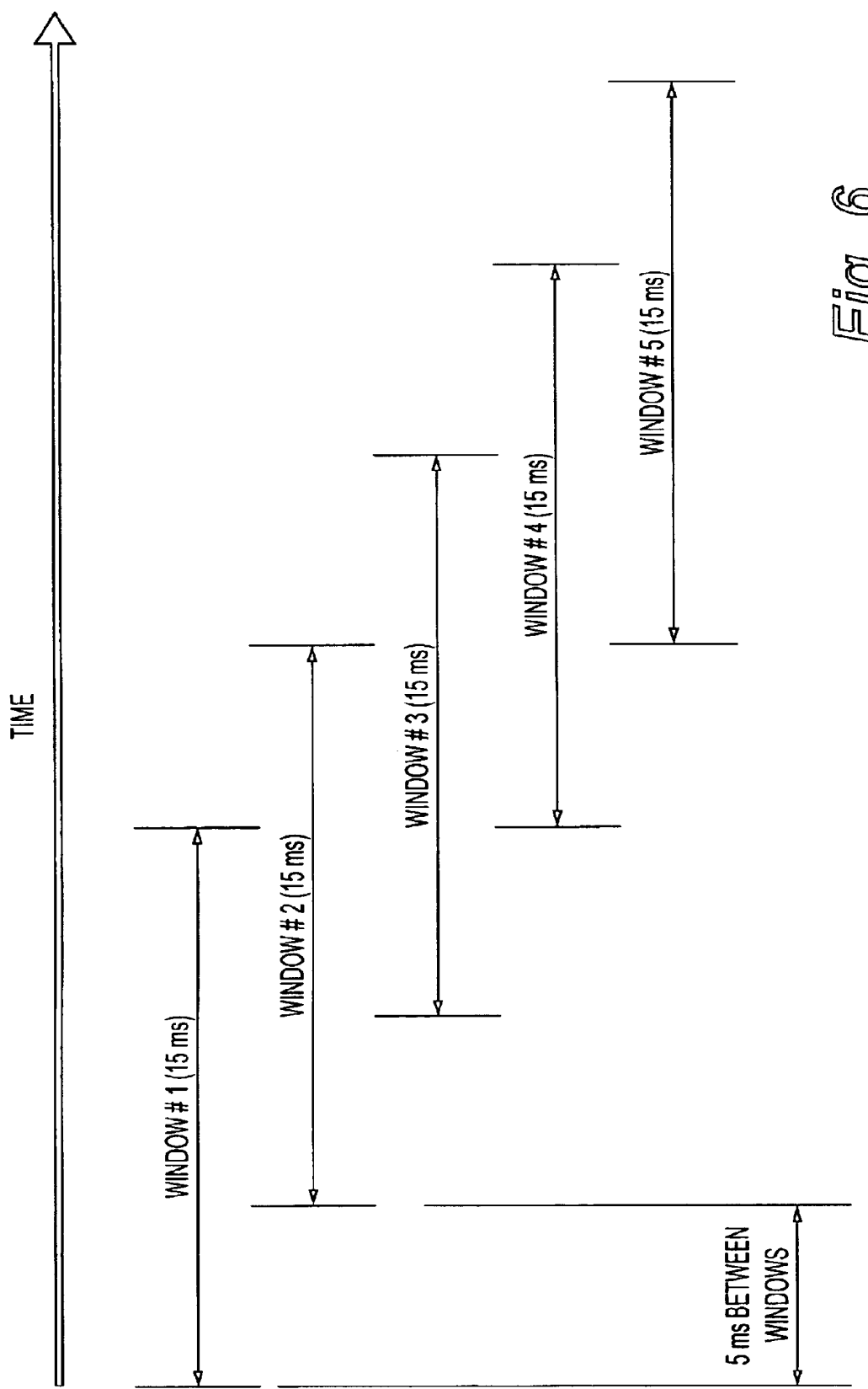

DETECTION OF BOTH VOICE AND TONES USING GOERTZEL FILTERS

TECHNICAL FIELD

This invention relates generally to call classification and call-progress monitoring.

BACKGROUND OF THE INVENTION

Call classification, also referred to as call-progress monitoring, is the term applied to determining what type of signals are present on a communications link. Generally, call classification needs to distinguish between noise, silence, voice (including other audio, such as music and announcements), and control signals (e.g., control tones), and to identify the particular control signals.

Various algorithms are commonly used for voice detection, such as peak-signal detection, rate-of-change of zero crossings, and auto-correlation. They tend to not be very accurate in distinguishing voice from other sounds, such as noise. For example, existing algorithms often misdetect clicks and pops produced by analog phone lines as voice. Also, many existing algorithms take a long time to identify presence of voice signals. But time is very critical in call processing, which requires substantially "real-time" call classification.

The use of Goertzel filters is known for control-tone detection and identification (see, e.g., U.S. Pat. Nos. 5,521,967 and 6,370,244, and the predictive call dialer from Avaya Inc. (formerly Mosaix Inc.), Redmond, Wash., USA). A Goertzel filter is an implementation of a Discrete Fourier Transform as a digital filter that is structured to reduce the number of computations required to compute the transform. It also requires minimal signal buffering because each signal sample is processed when received (i.e., substantially in "real-time" with only a small delay). However, call classifiers have not employed Goertzel filters for voice (audio) detection. For example, while U.S. Pat. No. 5,521,967 employs Goertzel filters for tone detection and identification, it employs a low-pass filter for voice detection. Since the low-pass filter allows both voice and noise signals to pass, the detector is susceptible to mis-identifying high noise levels as voice.

SUMMARY OF THE INVENTION

This invention is directed to solving these and other problems and disadvantages of the prior art. Generally according to the invention, Goertzel filters are used to detect presence of voice (including other audio signals, such as music) and to distinguish it from noise and control signals on a communications link. According to the invention, a voice detector comprises a plurality of Goertzel filters each operating at a different frequency within the voice range. Some of the filters operate at frequencies the same as those of control signals and others of the filters operate at frequencies other than those of the control signals. Each of the filters receives a signal to be analyzed for presence of voice and detects energy of the received signal at substantially one (the center of the notch) frequency of that filter. The voice detector further comprises a comparator connected to the filters, that compares the energies detected by the filters against thresholds. The comparator responds to at least three of the filters simultaneously detecting energy above a noise threshold and below a control signal threshold by indicating that the signal comprises voice. Illustratively acting as a call classifier, the comparator responds to a filter operating at a frequency of a control signal detecting energy above a control signal threshold by indicating that the analyzed signal comprises that control signal. Noise or silence is indicated when the total signal energy falls below a noise threshold.

Also according to the invention, a method of detecting voice in a signal to be analyzed comprises the operation of the Goertzel filters and the comparator as characterized above.

Compared to other means of voice detection, voice detection effected according to the invention is more accurate and faster. This is because voice detection effected according to the invention is based upon frequency information instead of empirical (heuristic) analysis and because it is not prone to confusion by line clicks and pops or other noise. It is also computationally efficient because it computes the signal energy at each frequency of interest only once, and then merely reuses this computed value in comparisons against different thresholds to determine what that energy represents.

BRIEF DESCRIPTION OF THE DRAWING

These and other features and advantages of the invention will become more apparent from the following description of an illustrative embodiment of the invention considered together with the drawing in which:

FIG. 6 is an illustration of target-signal windows created by a sampling and windowing function of the call classifier of FIG. 3.

DETAILED DESCRIPTION

Figure 1:
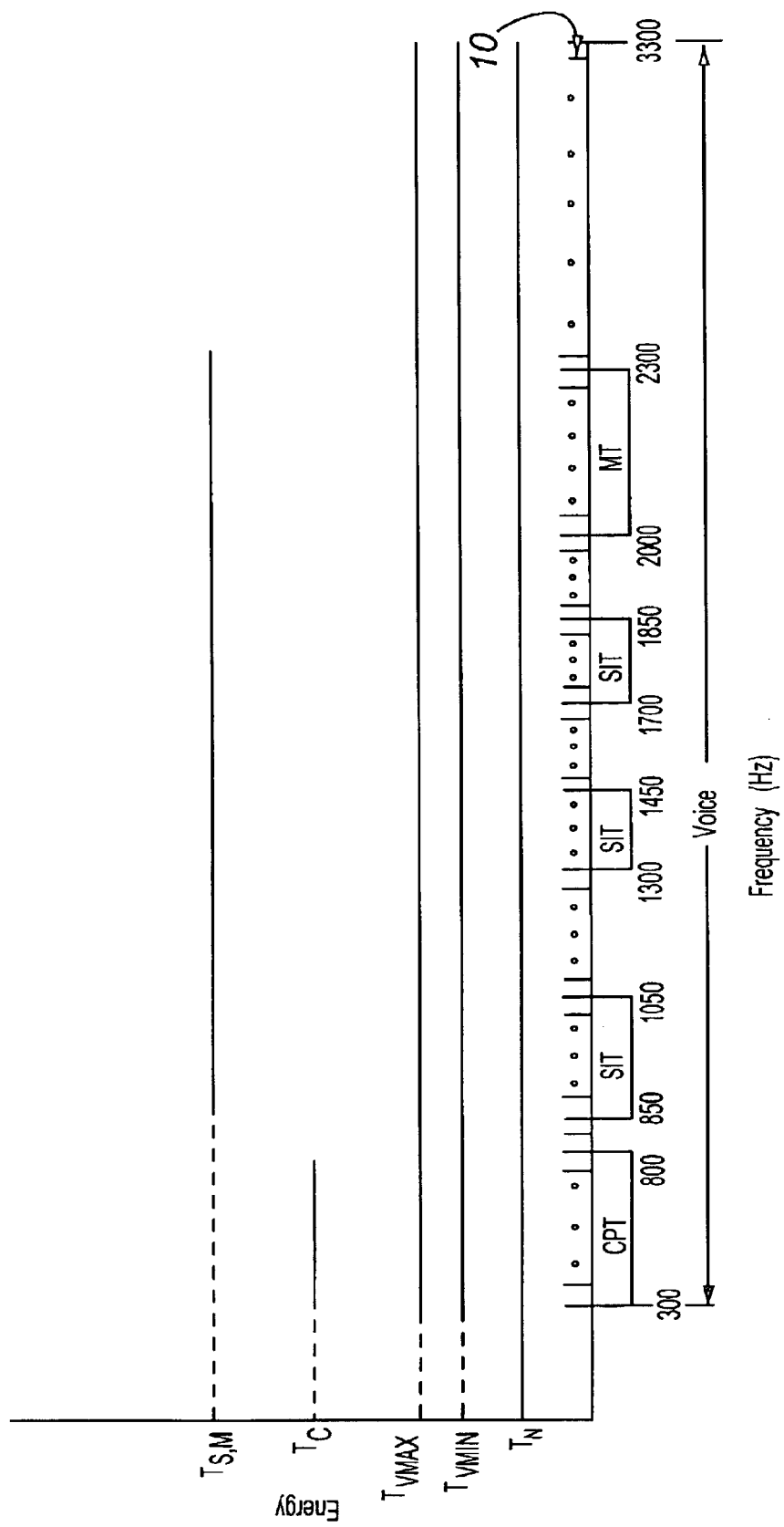
FIG. 1 is a graph of the frequencies and energy levels of voice and control signals in an illustrative communications link.

FIG. 1 shows the spectrum of signals that a call classifier typically must deal with. Call progress tones (CPTs), such as ringing, dial-tone, busy tone, reorder tone, etc., are typically located in the frequency range of 300–800 Hz. Special information tones (SITs), such as tones that precede network announcements, are typically located in the frequency ranges of 850–1050 Hz, 1300–1450 Hz, and 1700–1850 Hz. Modem tones (MTs), such as modem or fax answer acknowledgment, are typically located in the frequency range of 2000–2300 Hz. Voice signals mostly occupy the frequency range of about 0–4500 Hz, and are normally concentrated in the narrowband-voice-frequency range of 300–3300 Hz. Noise can occur at any and all frequencies.

Because CPTs are dual-frequency signals, signal energy is concentrated at two frequencies for each CPT. For each SIT and MT, energy is concentrated at one frequency, as they are single-frequency signals. In contrast, voice-signal energy is spread over the entire frequency range. Although the higher frequencies have less importance in speech than the lower frequencies, the average voice energy is generally spread over the entire spectrum. Hence, if a call classifier sees a high energy concentration at only one or two frequencies, then the signal is deemed to be of type "control signal" (i.e. "tone") and not "voice," because "voice" has substantially equal distribution of energy over a large number of frequencies.

According to the invention, therefore, a plurality of Goertzel filters, with frequencies 10 spaced over the entire voice spectrum as shown in FIG. 1, is used for call classification. Within the control signal (CPT, SIT, and MT) bands, a Goertzel filter is centered at each control-signal frequency. Goertzel filters centered at additional frequencies within the control signal bands may also be used. Additional Goertzel filters are used at frequencies outside of the control signal bands within the voice band. Illustratively, Goertzel filters having frequencies 10 spaced about every 100 Hz throughout the voice band are employed. However, the Goertzel filters need not be spaced equally across the entire spectrum, but may be more concentrated in sub-spectra of most interest, i.e., in the CPT, SIT and MT bands. Also, minimum Goertzel filter frequency spacing is inversely proportional to signal sample window size, to ensure that the Goertzel filters' notch (detection) spectra do not overlap.

A Goertzel filter detects presence of a signal at its corresponding (notch center) frequency if it detects energy at that frequency that relates to a threshold energy level in a predetermined way (e.g., exceeds the threshold). The threshold energy level may be expressed as a ratio of the energy detected at the corresponding frequency and the total signal energy.

It has been empirically determined that if a Goertzel filter within the SIT or MT frequency bands detects a concentration $T_{S,M}$ of about 60% or more of the total detected signal energy, then a SIT or an MT control signal has been detected; if a pair of Goertzel filters within the CPT frequency band each detects a concentration $T_C$ of about 50% of the total energy, then a CPT control signal has been detected; and if a minimum predetermined number (>2) of Goertzel filters each detects an energy above a predetermined threshold, then voice has been detected. The predetermined number is determined empirically, based upon the application. The predetermined number of filters varies inversely with the magnitude of the threshold, and the magnitude of the threshold varies directly with the size of the signal sample window. For example, if each of at least three Goertzel filters detects a concentration $T_V$ of between about 10% ($T_{VMIN}$) and 20% ($T_{VMAX}$) of the total energy of a 15 msec. signal sample window, then voice has been detected. Moreover, if the total detected energy is less than a certain threshold $T_N$, then either noise or silence has been detected. $T_N$ is illustratively in the range of 1.2% to 3%. The upper limit for values that may be selected as $T_{VMAX}$ is $T_C$ in the CPT band and $T_{S,M}$ in the SIT and MT bands; the lower limit for values that may be selected as $T_{VMIN}$ is $T_N$.

Figure 2A:
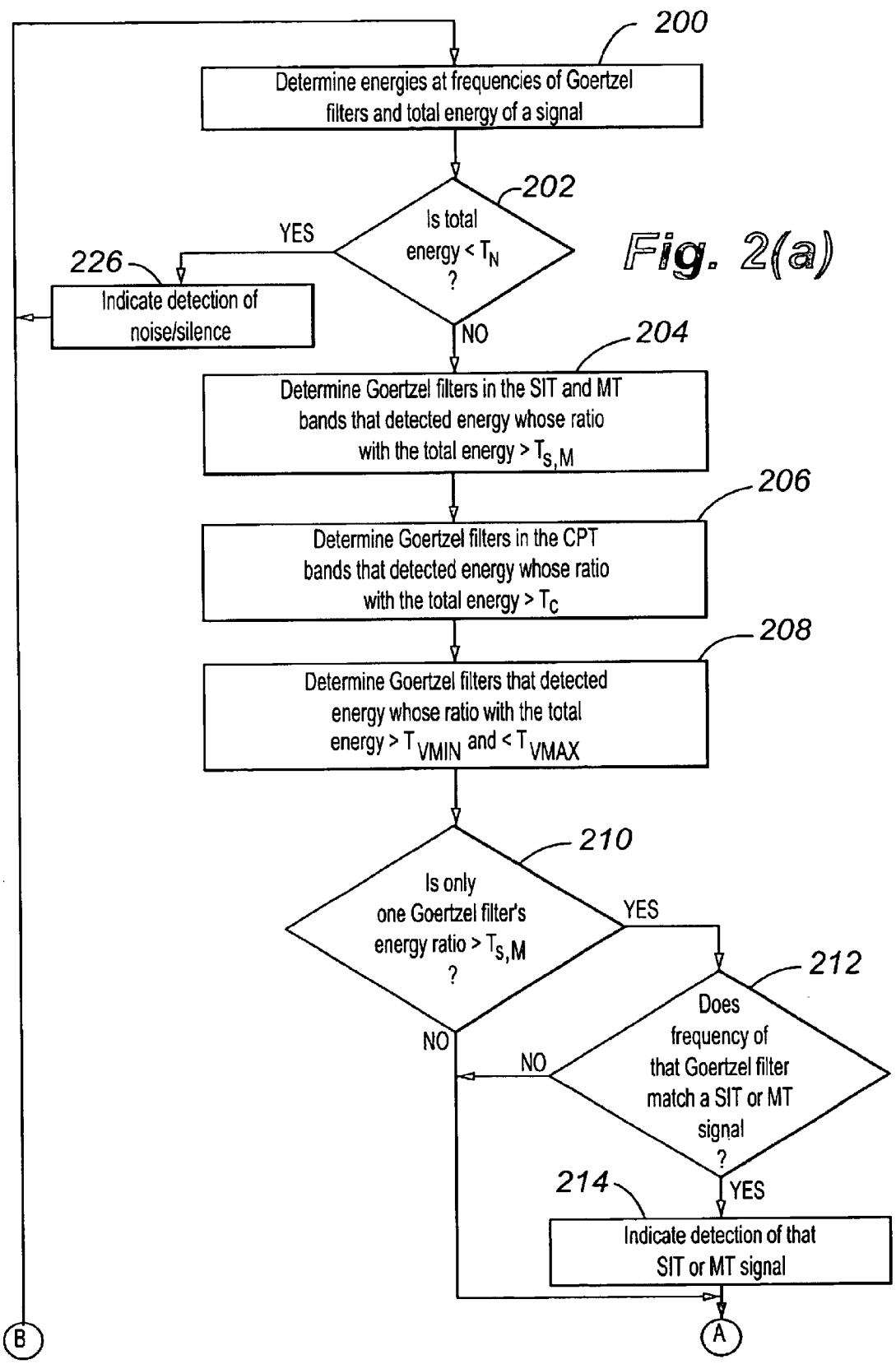
FIGS. 2($a$) and 2($b$) are a flowchart of logic of voice and control signal detection according to the invention for the graph of FIG. 1.
Figure 2B:
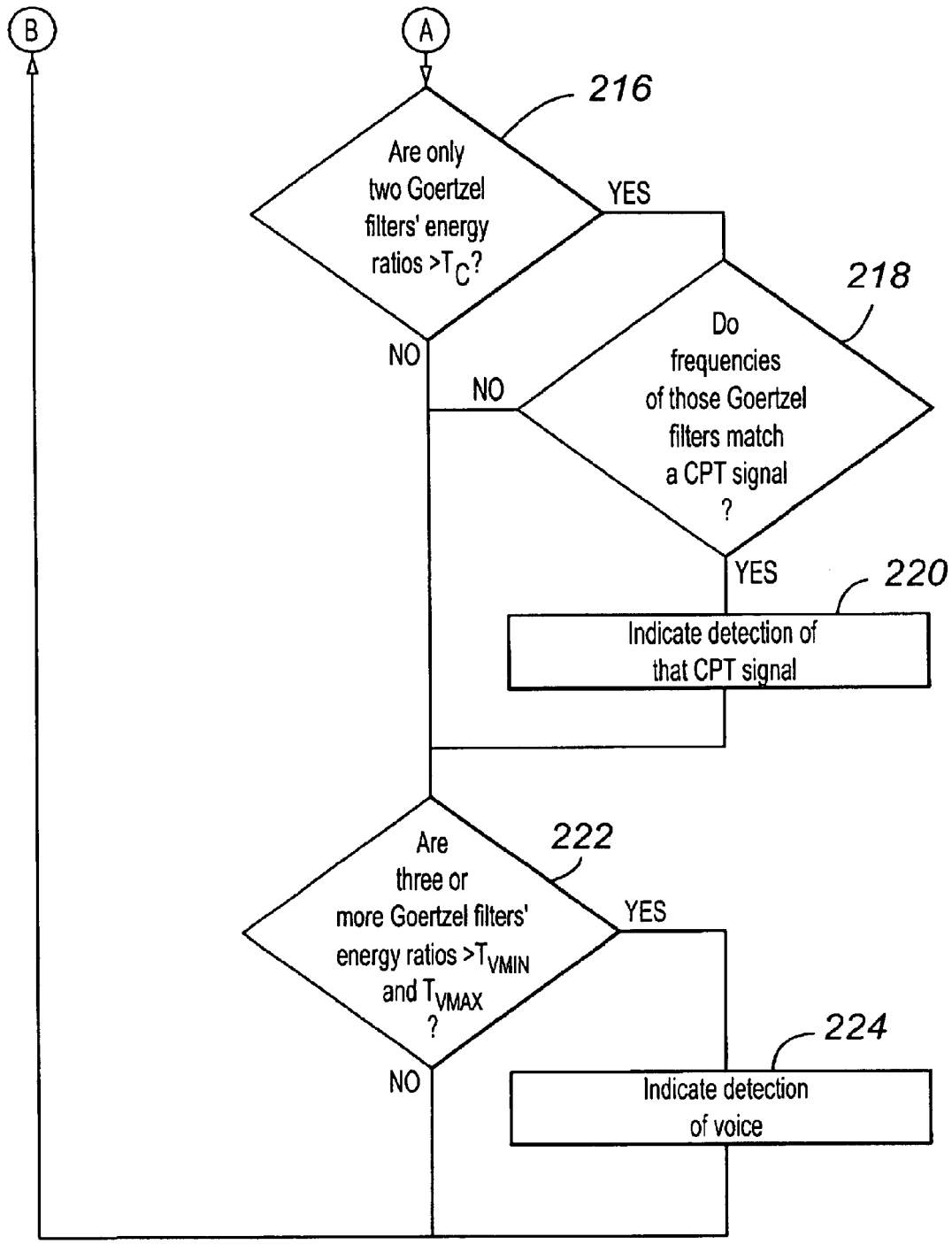

The logic of this call classification is diagrammed in FIG. 2. The energies at the Goertzel filters' frequencies as well as the total signal energy are determined in a signal sample window, at step 200. If the total detected signal energy is below the noise threshold of $T_N$, as determined at step 202, detection of silence or noise is indicated, at step 226. If the total energy is not below $T_N$, then the Goertzel filters in the SIT and MT frequency bands that detected energy whose ratio with the total energy is above the $T_{S,M}$ threshold are identified, at step 204, the Goertzel filters in the CPT frequency band that detected energy whose ratio with the total energy is above the $T_C$ threshold are identified, at step 206, and the Goertzel filters in the voice frequency band that detected energy whose ratio with the total energy is between the $T_{VMIN}$ and $T_{VMAX}$ threshold are identified, at step 208. Alternatively, instead of comparing the ratios against thresholds, the detected energies could have been directly compared against thresholds at steps 204–208 if the amplitude of signals, voice, and noise stays substantially constant over time. If exactly one Goertzel filter in the SIT and MT frequency bands detected energy whose ratio with the total energy is above the $T_{S,M}$ threshold, as determined at step 210, and that filter's notch center frequency corresponds to a SIT or an MT signal frequency, as determined at step 212, detection of that SIT or MT signal is indicated, at step 214. Additionally, if exactly two Goertzel filters in the CPT frequency band detected energy whose ratio with the total energy is above the $T_C$ threshold, as determined at step 216, and those filters' frequencies correspond to the two frequencies of a CPT signal, as determined at step 218, detection of that CPT signal is indicated, at step 220. Additionally, if three or more Goertzel filters detected energy whose ratio with the total energy is between the $T_{VMIN}$ and $T_{VMAX}$ thresholds, as determined at step 222, detection of voice is indicated, at step 224. The process is then repeated for the next signal sample window.

Figure 3:
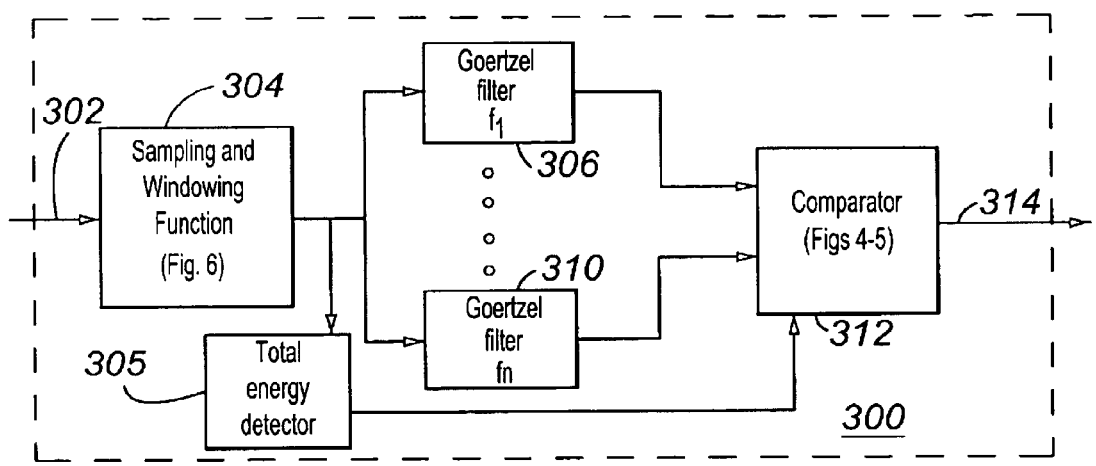
FIG. 3 is a block diagram of a call classifier that implements an illustrative embodiment of the invention.

The configuration of a call classifier 300 that embodies an illustrative implementation of the invention is shown in FIG. 3. Call classifier 300 is connected to an input 302 of the target signals that are to be classified. A sampling and windowing function 304 takes samples (determines values) at different points in time of the amplitude (energy) of the target signal stream, and groups pluralities of successive samples into groups that represent segments, or windows, of the target signal stream. Function 304 then supplies the samples to a total energy function 305 and to a plurality of Goertzel filters 306–310.

In one implementation, each second of the target signal stream is broken up by function 304 into 360 windows that are sampled at an 8 kHz rate. Each window is 15 msecs. long. Illustratively, function 304 performs a zeroth-order Discrete Spheroidal Sequences (DPSS) windowing function with a bandwidth of 50 Hz on 15 msecs. (120 samples) of input signal. The starting times of consecutive windows are 5 msecs. apart; consequently, every three consecutive windows partially overlap each other. This produces a sliding window as shown in FIG. 6. Overlapping windows are preferred because they produce higher detection accuracy than non-overlapping sequential windows. Also preferably, tapered windows (attenuated at the beginning and at the end) are used, in order to diminish the frequency-domain spikes caused by the turning on and turning off of rectangular windows.

Function 305 determines a total signal energy value $E_T$ for each window. $E_T$ is the square of the total energy in the window, and is computed as $E_T = \Sigma x_j^2$, j=1, ... P, where P is the number of samples in each window and x is the amplitude (energy) of an individual sample.

Goertzel filters 306–310 determine the signal energy value in each window at each Goertzel filter's respective frequency. Each energy value is the square of the signal amplitude (energy) at that frequency. The plurality of Goertzel filters 306–310 may comprise a plurality of physically-distinct Goertzel filters. Or, the plurality of Goertzel filters may be virtual filters that are implemented via a single tuneable Goertzel filter that is time-shared by the plurality of virtual Goertzel filters. Such a tuneable time-shared Goertzel filter may be implemented in firmware via a digital signal processor (DSP), in hardware via a field-programmable gate array (FPGA), or via software running on a computer.

The outputs of total energy detector 305 and of Goertzel filters 306–310 are supplied to a comparator 312 that makes a determination therefrom of what has been detected and indicates the determination at an output 314. In one embodiment, comparator 312 looks for consistent detection by a Goertzel filter in three out of five consecutive windows. That is, if in three out of five consecutive windows the Goertzel filter detects energy having the same relationship to a signal's threshold(s), then that signal is deemed to have been detected. Comparator 312 may also be implemented in hardware, firmware, and/or software. Its functionality is shown in FIGS. 4–5.

Figure 4:
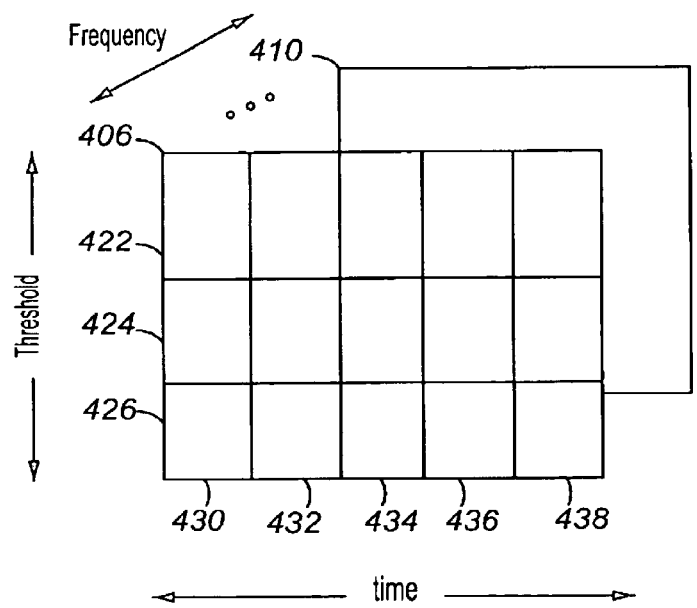
FIG. 4 is a block diagram of a data entity of a comparator and combiner of the call classifier of FIG. 3.

As shown in FIG. 4, each Goertzel filter 306–310 has associated therewith its own data structure, state machine, or other entity 406–410, respectively that represents a plurality of entries or tallies 422–426. Each tally 422–426 corresponds to a different threshold $T_{S,M}$, $T_C$, and $T_V$, respectively, of FIG. 1, and comprises five flags 430–438 that are addressed in a round-robbin fashion. Flags 430–438 correspond to the current and the past four windows analyzed by the corresponding Goertzel filter, and flags 430–438 of each tally 422–426 indicate those of the five latest windows whose detected energy matched the tally's corresponding threshold.

Figure 5A:
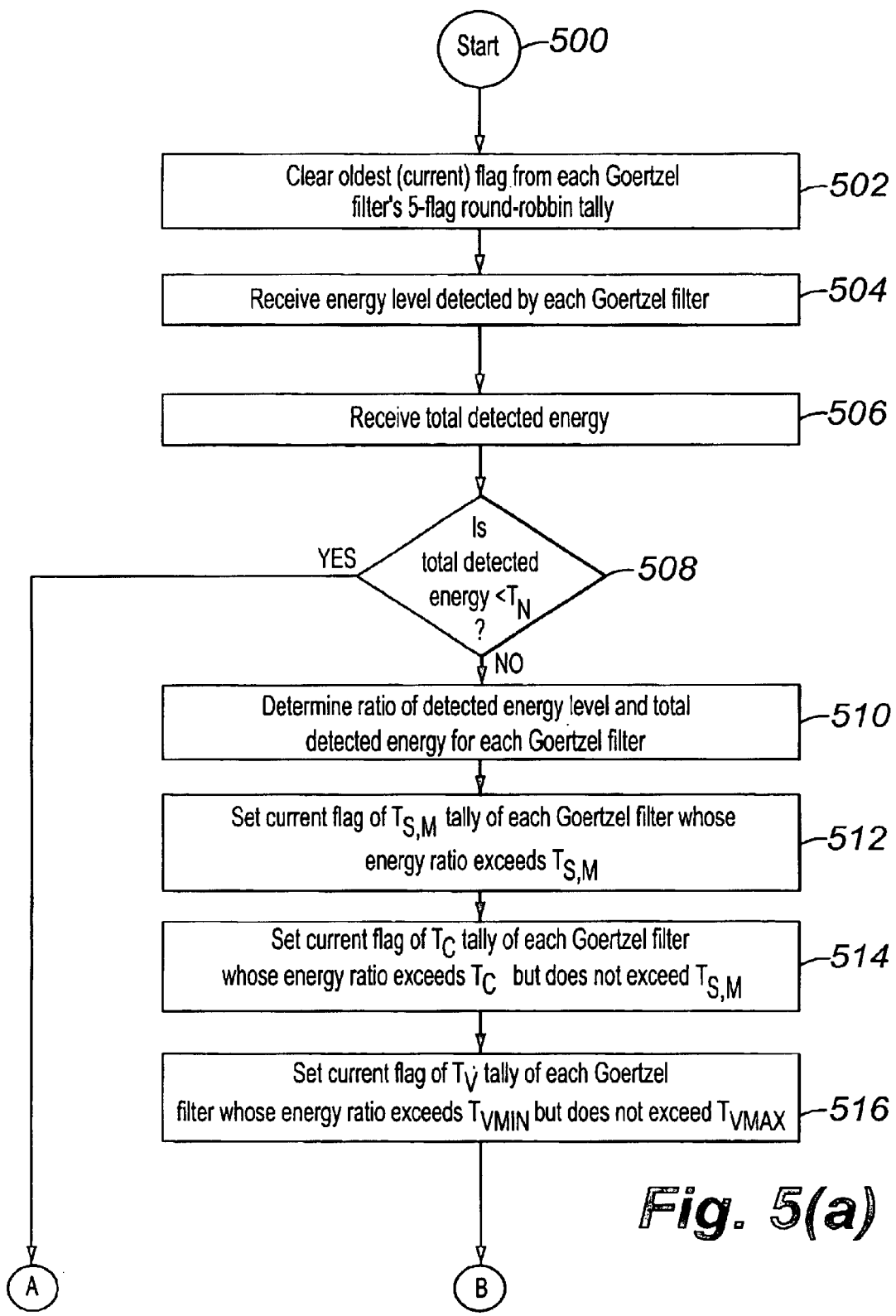
FIG. 5 is a flow diagram of the operation of the comparator and combiner of the call classifier of FIG. 3.
Figure 5B:
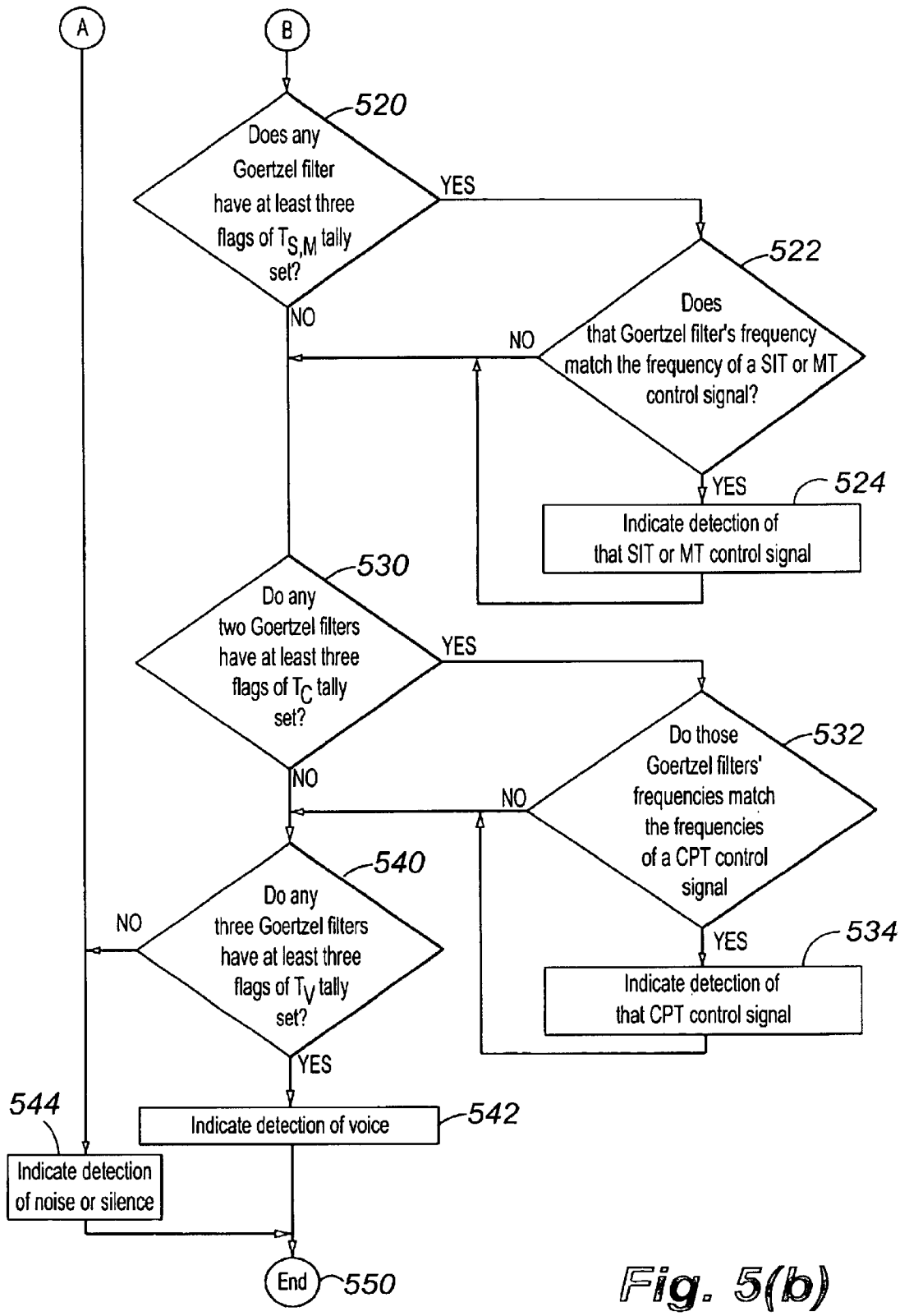

Turning to FIG. 5, the procedure shown here is performed by comparator and combiner 312 for each window, i.e., every 5 msecs. for the overlapping windows described above. Upon each start of the procedure, at step 500, element 312 clears the oldest flag 430–438 of each tally 422–426 of each Goertzel filter's data entity 406–410, at step 502. The cleared oldest flag of each tally 422–426 now becomes the current flag. Element 312 receives from each Goertzel filter 306–310 the energy level detected by that filter during the current window, at step 504, and it combines those energy levels to determine the total energy level $E_t$ of the current window, at step 506. Element 312 then checks whether the total detected energy level is exceeded by the noise energy level $T_N$, at step 508. If so, element 312 proceeds to step 544; if not, element 312 proceeds to step 510. At step 510, element 312 determines the ratio of the detected energy level and the total detected energy of the current window for each Goertzel filter 306–310. Element 312 then sets the current one of the flags 430–438 of tally 422 of each Goertzel filter 306–310 whose energy ratio exceeds the energy threshold $T_{S,M}$, at step 512, sets the current one of the flags 430–438 of tally 424 of each Goertzel filter 306–310 whose energy ratio exceeds the energy threshold $T_C$ but does not exceed the energy threshold $T_{S,M}$, at step 514, and sets the current one of the flags 430–438 of tally 426 of each Goertzel filter 306–310 whose energy ratio exceeds the energy threshold $T_{VMIN}$ but does not exceed the energy threshold $T_{VMAX}$, at step 516.

Element 312 then checks if any Goertzel filter 306–310 has at least three flags 430–438 of its $T_{S,M}$ tally 422 set, at step 520. If so, for each of the Goertzel filters 306–310 that has at least three flags 430–438 of tally 422 set, element 312 checks whether that Goertzel filter's frequency matches the frequency of an SIT or MT control signal, at step 522, and if so, indicates that the corresponding SIT or MT signal has been detected, at step 524. Element 312 next checks if any two Goertzel filters 306–310 have at least three flags 430–438 of their $T_C$ tallies 424 set, at step 530. If so, for each pair of the Goertzel filters 306–310 that have at least three flags 430–438 of tally 424 set, element 312 checks whether the frequencies of the Goertzel filter pair match the frequencies of an CPT control signal, at step 532, and if so, indicates that the corresponding CPT signal has been detected, at step 534. Next, element 312 checks in any three Goertzel filters 306–310 have at least three flags 430–438 of their $T_V$ tallies 426 set, at step 540. If so, element 312 indicates that voice has been detected, at step 542; if not, element 312 indicates that noise or silence has been detected, at step 544. Element 312 then ends the procedure for the current window, at step 550.

Of course, various changes and modifications to the illustrative embodiment described above will be apparent to those skilled in the art. For example larger numbers of windows could be checked to make a determination. Also, larger numbers of set flags could be used to confirm a determination (e.g., to confirm detection of voice). Also, the invention can be used to distinguish voice from other types of sounds. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A voice detector comprising:
   a plurality of Goertzel filters each operating at a different frequency within a voice range, some of the filters operating at frequencies of control signals and others of the filters operating at frequencies other than the control signals' frequencies, each filter for receiving a signal to be analyzed for presence of voice and detecting energy of the signal at the operating frequency of the filter; and
   a comparator connected to the filters, for comparing the energies detected by the filters against thresholds and responsive to at least three of the filters simultaneously detecting energy above a noise threshold and below a control signal threshold by indicating that the signal comprises voice.

2. The voice detector of claim 1 wherein:
   the comparator is responsive to a filter of the filters operating at a frequency of a control signal and detecting energy above a control signal threshold by indicating that the analyzed signal comprises the control signal.

3. The voice detector of claim 1 wherein:
   the comparator is responsive to one of the filters operating at a frequency of a single-frequency control signal detecting energy above a first control signal threshold by indicating that the analyzed signal comprises the single-frequency control signal, and is responsive to two of the filters operating at frequencies of a dual-frequency control signal each detecting energy above a second control signal threshold different from the first control signal threshold by indicating that the analyzed signal comprises the dual-frequency control signal.

4. The voice detector of claim 1 further comprising:
   a detector that detects total energy of the signal to be analyzed; wherein
   the comparator is responsive to the total detected energy being below a noise threshold by indicating that the analyzed signal comprises noise or silence.

5. The voice detector of claim 4 wherein:
   the comparator compares the energies detected by the filters against the thresholds by comparing ratios of the energies detected by individual ones of the filters and the total detected energy against the thresholds.

6. A call classifier comprising:
   a plurality of Goertzel filters each operating at a different frequency within a voice range, some of the filters operating at frequencies of control signals and others of the filters operating at frequencies other than the control signals frequencies, each filter for receiving windows of a signal to be analyzed for presence of voice and detecting energy of the signal in the windows at the operating frequency of the filter;

a detector that detects in the windows total energy of the signal to be analyzed; and a comparator connected to the filters, for comparing ratios of the energies detected by the individual filters in a window and the total detected energy in the window against thresholds, responsive to the total detected energy in the widow not exceeding a noise threshold by indicating that the analyzed signal comprises silence or noise, responsive to one of the filters operating at a frequency of a single-frequency control signal detecting in the window energy whose ratio exceeds a first control signal threshold by indicating that the analyzed signal comprises said single-frequency control signal, responsive to two of the filters operating at frequencies of a dual-frequency control signal each detecting in the window energy whose ratio exceeds a second control signal threshold by indicating that the analyzed signal comprises said dual-frequency control signal, and responsive to at least three of the filters each detecting in the window energy whose ratio exceeds a voice threshold by indicating that the signal comprises voice.

7. The call classifier of claim 6 wherein:

each window represents a different segment of the signal to be analyzed.

8. The call classifier of claim 6 wherein:

each window represents a different tapered segment of the signal to be analyzed.

9. The call classifier of claim 6 wherein:

each window represents a different segment of the signal to be analyzed and wherein consecutive said windows partly overlap each other.

10. A method of detecting voice in a signal to be analyzed for presence of voice, comprising:

detecting energy of the signal at operating frequencies of a plurality of Goertzel filters each operating at a different frequency within a voice range with some of the filters operating at frequencies of control signals and others of the filters operating at frequencies other than the control signals' frequencies;

comparing the energies detected by the filters against thresholds; and in response to at least three of the filters simultaneously detecting energy above a noise threshold and below a control signal threshold, indicating that the signal comprises voice.

11. The method of claim 10 further comprising:

in response to a filter of the filters operating at a frequency of a control signal detecting energy above a control signal threshold, indicating that the analyzed signal comprises the control signal.

12. The method of claim 10 further comprising:

in response to one of the filters operating at a frequency of a single-frequency control signal detecting energy above a first control signal threshold, indicating that the analyzed signal comprises the single-frequency control signal; and in response to two of the filters operating at frequencies of a dual-frequency control signal each detecting energy above a second control signal threshold different from the first control signal threshold, indicating that the analyzed signal comprises the dual-frequency control signal.

13. The method of claim 10 further comprising:

detecting total energy of the signal to be analyzed;

comparing the total detected energy against a noise threshold; and in response to total detected energy being below the noise threshold, indicating that the analyzed signal comprises noise or silence.

14. The method of claim 13 wherein:

comparing the energies detected by the filters comprises comparing ratios of the energies detected by individual ones of the filters and the total detected energy against the thresholds.

15. A method of detecting voice in a signal to be analyzed for presence of voice, comprising:

detecting energy of the signal at operating frequencies of a plurality of Goertzel filters each operating at a different frequency within a voice range, some of the filters operating at frequencies of control signals and others of the filters operating at frequencies other than the control signals frequencies, wherein each filter receives windows of the signal to be analyzed for presence of voice and detects energy of the signal in the windows at the operating frequency of the filter;

detecting in the windows total energy of the signal to be analyzed;

comparing ratios of the energies detected by the individual filters in a window and the total detected energy in the window against thresholds;

in response to the total detected energy in the widow not exceeding a noise threshold, indicating that the analyzed signal comprises silence or noise;

in response to one of the filters operating at a frequency of a single-frequency control signal detecting in the window energy whose ratio exceeds a first control signal threshold, indicating that the analyzed signal comprises said single-frequency control signal;

in response to two of the filters operating at frequencies of a dual-frequency control signal each detecting in the window energy whose ratio exceeds a second control signal threshold, indicating that the analyzed signal comprises said dual-frequency control signal; and in response to at least three of the filters each detecting in the window energy whose ratio exceeds a voice threshold, indicating that the signal comprises voice.

16. The method of claim 15 wherein:

each window represents a different segment of the signal to be analyzed.

17. The method of claim 15 wherein:

each window represents a different tapered segment of the signal to be analyzed.

18. The method of claim 15 wherein:

each window represents a different segment of the signal to be analyzed and wherein consecutive said windows partly overlap each other.

* * * * *